United States Patent [19]

Hasselmeier

[11] Patent Number: 4,581,710
[45] Date of Patent: Apr. 8, 1986

[54] METHOD OF EDITING DOT PATTERN DATA FOR CHARACTER AND/OR IMAGE REPRESENTATIONS

[75] Inventor: Helmut Hasselmeier, Aidlingen, Fed. Rep. of Germany

[73] Assignee: International Business Machines (IBM), Armonk, N.Y.

[21] Appl. No.: 497,621

[22] Filed: May 24, 1983

[30] Foreign Application Priority Data

May 24, 1982 [EP] European Pat. Off. ........ 82104509.3

[51] Int. Cl.⁴ .......................................... B41B 25/18
[52] U.S. Cl. .................................. 364/523; 364/200; 364/900
[58] Field of Search ............... 340/717, 724, 731, 748; 364/200 MS File, 521, 523, 900 MS File, 200, 900; 400/121, 124

[56] References Cited

U.S. PATENT DOCUMENTS 3,623,005 11/1971 Roberts, Jr. .................. 364/900
3,828,319 8/1974 Owen et al. .................. 364/200 X
4,051,457 9/1977 Inose et al. .................. 364/900 X
4,195,338 3/1980 Freeman ...................... 364/200
4,254,409 3/1981 Busby ......................... 340/731
4,353,653 10/1982 Zimmerman ................... 400/124 X
4,373,194 2/1983 Demke et al. ................. 364/521 X Primary Examiner—Errol A. Krass
Assistant Examiner—Edward R. Cosimano
Attorney, Agent, or Firm—Bell, Seltzer, Park & Gibson

[57] ABSTRACT

For the layout of a page, text and image blocks with data for positioning them on the page are supplied to the data processing system.

The image blocks contain pattern information and the text blocks character codes. The pattern information for the characters is stored in a typefont buffer.

For editing the data to be recorded, a so-called "window storage" (5) is provided, whose lines (W1–W7) are cyclically associated with successive dot pattern lines (P1, P2, P3 ...) on the page (4). For this purpose, the window storage (5), figuratively speaking, successively assumes different window positions (I, II, III) from top to bottom on the page.

The height of the window storage (5) is chosen so that it is suitable for accommodating on the page a character with maximum ascender and descender heights.

This ensures that the pattern information of a character is transferred to the window storage (5) at one go (in continuous periods).

The edit sequence in the window storage (5) for pattern data of aligned or non-aligned lines of adjacent text blocks on the page depends on the sequence of the upper line boundaries and the baselines on the page, respectively.

12 Claims, 22 Drawing Figures

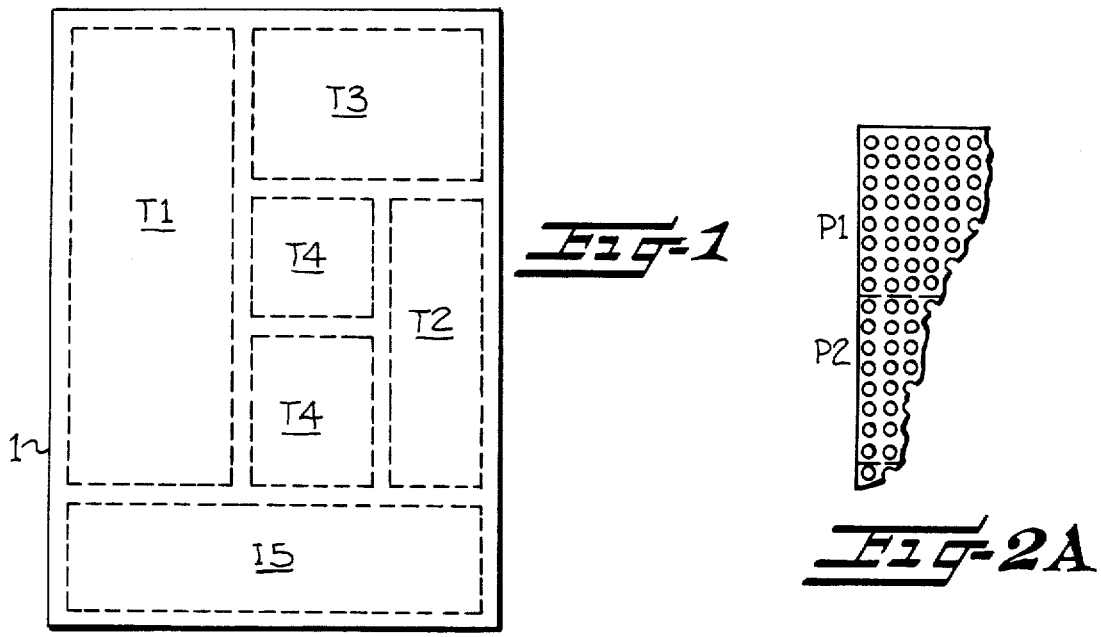
Fig-1
Fig-2A
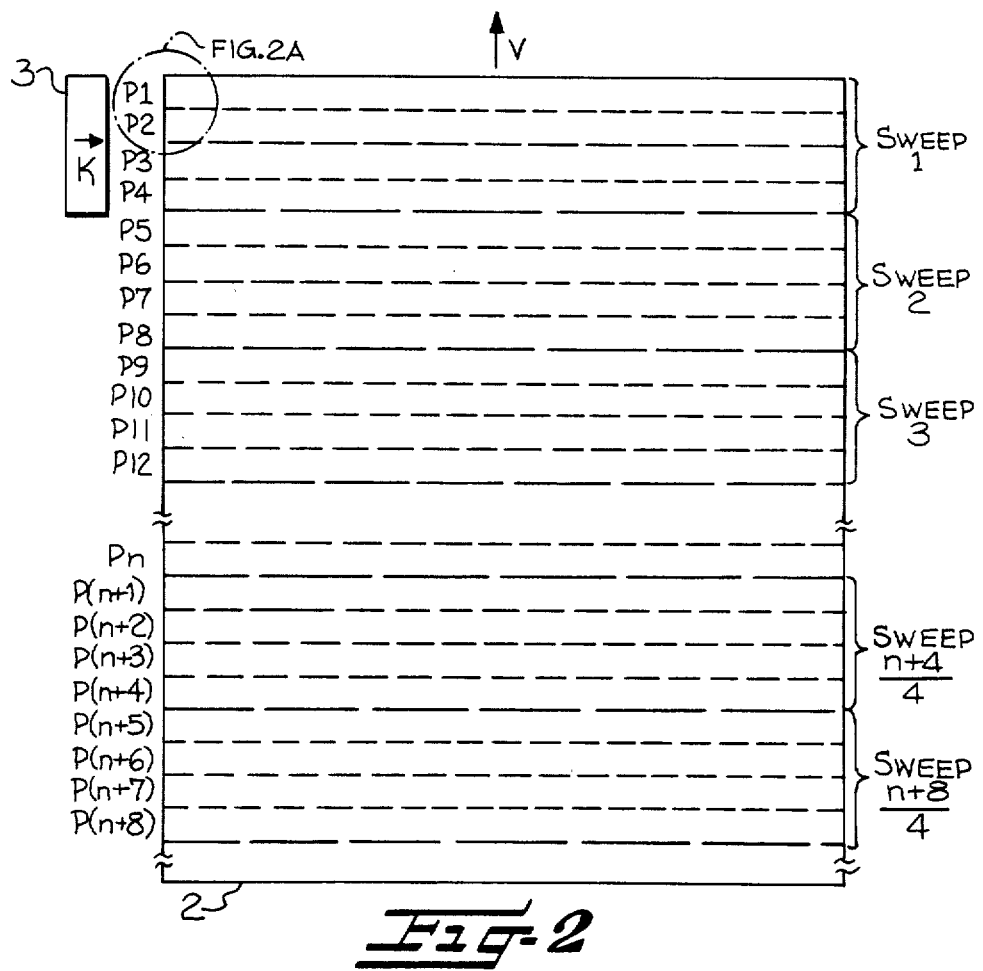
Fig-2

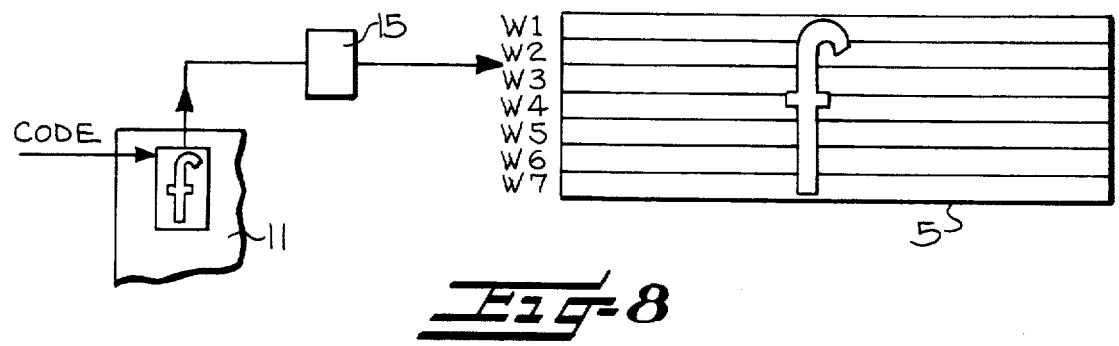
_Fig-8_
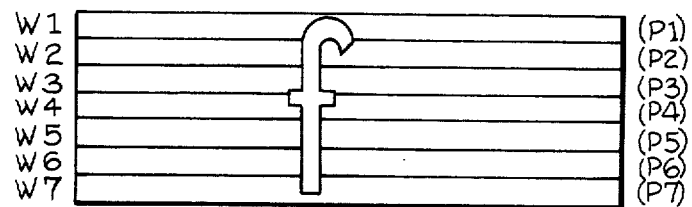
_Fig-9_
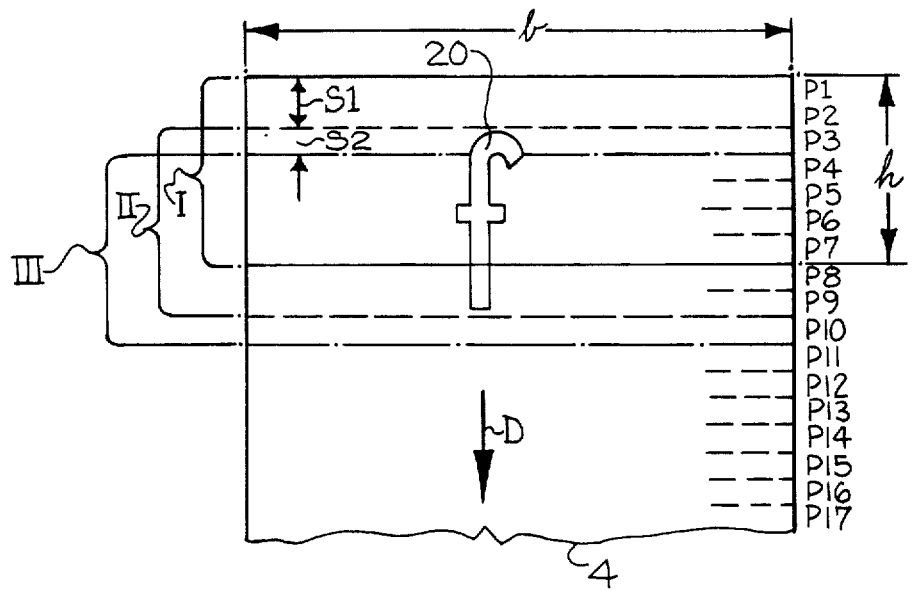
_Fig-10_

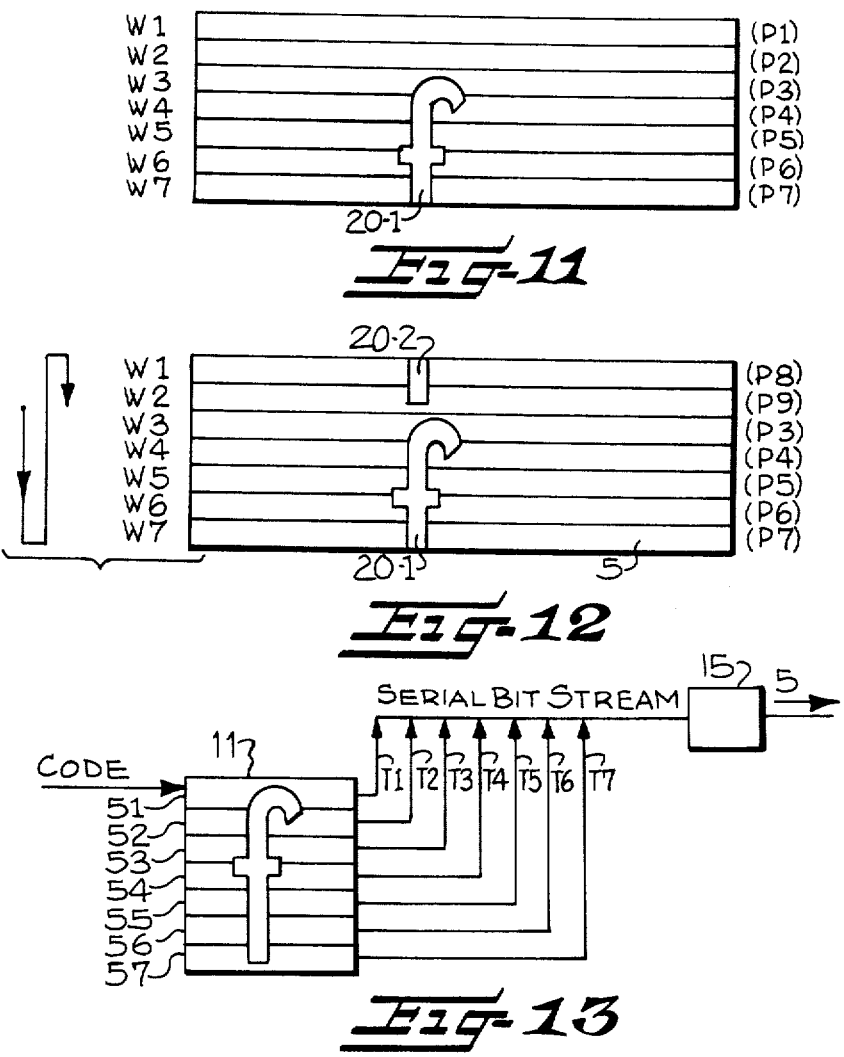
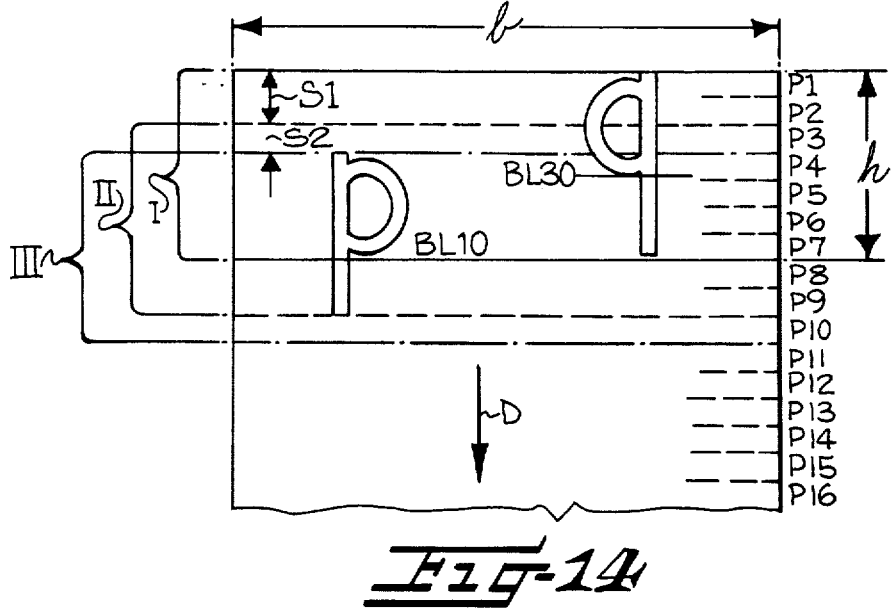

METHOD OF EDITING DOT PATTERN DATA FOR CHARACTER AND/OR IMAGE REPRESENTATIONS

FIELD AND BACKGROUND OF THE INVENTION

The invention concerns a method of editing in the storage of a data processing system character and/or image information to be represented in dot pattern lines on a page (or image screen) of a recording medium. Various print processes are known, wherein characters and graphical data are recorded in the form of dot patterns. Such dot patterns may be generated, for example, by mosaic (needle) printers, metal paper printers, laser printers or raster displays. All of these recording processes provide for a dot-shaped recording to be generated by suitable print elements or for print beams to be controlled so as to generate such a recording.

The printout of pages with text and/or graphical information (hereinafter collectively referred to as "information") substantially depends on the layout, i.e., the way in which text and image blocks (hereinafter collectively referred to as "blocks") are arranged relative to each other on a page (or image screen).

By means of data processing systems and the above-mentioned output units driven by them the information to be recorded is initially edited in the storage of the data processing system. A CPU (Central Processing Unit) controls the data processing systems and the output units. Such a storage consists of a plurality of storage cells (bits), each storing the information of a picture element to be printed (subsequently referred to as pel which is short for the term "picture element". Thus, the page to be printed is initially edited in storage dot-by-dot before each stored pel can be printed at its predetermined position on the page. Such a print storage would have to be enormous, particularly for high resolution print methods. Print pages with some 33 million pels are not seldom, i.e., the print storage, if it were to reproduce an entire page bit-by-bit would have to have a capacity of 33 million bits.

However, with such an approach the size of the print storage would become excessive.

For modern data processing systems, such storage sizes would be inexpedient; even in the case of a virtual storage concept, certain disadvantages could not be ignored. Virtual, in this context, means that the data processing system has an extremely large external storage and that the information of this external storage is read in blocks into the work storage of the data processing system where it is processed. In other words, a page to be edited can be stored in bits in an external storage, but for editing such a page in work storage, the respective page blocks would have to be read in and then read out, which is rather time-consuming.

From German Offenlegungsschrift OS No. 25 16 332, a method is known for coding electrical signals which are obtained upon scanning a graphical pattern comprising text and images. For this purpose, the graphical pattern is divided into sub-areas and coding of the electrical signals obtained upon scanning the sub-areas, substantially containing image and text data, is effected by means of an image and text code, respectively.

In German Offenlegungsschrift OS No. 28 25 321 on an all-points-addressable printer is described for printing characters of different sizes and/or typefonts at arbitrary positions on a page either from right to left or from top to bottom. This printer is also suitable for graphical representations.

In U.S. Pat. No. 3,828,319, a system is described for generating a dot pattern image from binary signals supplied by a computer. This system uses so-called pushdown storages, consisting of two separate registers, for merging information.

Furthermore, German Offenlegungsschrift OS No. 21 61 038 describes a method of generating data for producing screened rotary type forms, wherein screen dots are recorded on the print form as adjacent lines. Data for recording the screen dots are derived, according to the respective screen selected, from character and image masters and stored as data groups in one or several first storages. The data groups of characters and images to be recorded are fetched from the first storage(s), sorted according to the sequence in which they are to be recorded and stored in buffers from where they are fetched as image lines, belonging to the same recording lines, to control the continuous recording process at the clock of the selected screen.

In German Offenlegungsschrift OS No. 27 24 199, a system is described for optically reproducing symbols, characters, and representations, in particular for the layout of advertisements in newspapers and the like. For accommodating information, this system is provided with terminal control means transmitting data, control signals, addresses, and time clock signals to a common logical control associated with the system. This logical control is associated with a computer for processing the data, addresses, and time clock pulses received.

In German Offenlegungsschrift OS No. 27 24 075, a system is described for optically reproducing symbols, characters and representations, in particular for the layout of advertisements in newspapers and the like, using a common logical control and display units. For this purpose, predetermined stored signals as well as subsequently stored variable signals, associated with symbols, characters, and representations, are combined in the common, logical control. Optical reproduction is effected by image storage means associated with this control.

The processes that have become known so far for editing a page to be printed require either too much storage space or time.

Methods and systems for print data editing other than those mentioned are often too specific or necessitate special extensive circuitry.

To overcome these disadvantages, it is the object of the invention to provide an approach requiring only relatively little storage space for rapidly editing print data in the storage of the data processing system.

This object is accomplished by the measures specified in the characterizing part of claim 1.

Preferred embodiments of the method in accordance with the invention will be seen from the subclaims.

BRIEF DESCRIPTION OF THE DRAWINGS

An embodiment of the invention will be described in detail below by means of the accompanying drawings in which:

FIG. 1 is a layout plan for a page to be printed comprising text and image blocks.

FIG. 2 is a schematic of the structure of a page to be printed consisting of individual dot pattern lines, arranged one below the other, of which several can be simultaneously printed by means of a print head moving across the page in line direction.

FIG. 2a is a schematic detail representation of FIG. 2 showing the dot pattern in the dot pattern lines and the dot pattern strips (page strips).

FIG. 8 is a schematic showing the transfer of the dot pattern information for the character f from the typefont buffer to the window storage.

FIG. 9 is a schematic of the character f transferred to the window storage for particular page strips.

FIG. 10 is a schematic of the output of the character f into other page strips for window position II.

FIG. 11 is a schematic showing the character f partly accommodated in the window storage for window position I.

FIG. 12 is a schematic of the character f fully accommodated in the window storage corresponding to window position II.

FIG. 13 is a schematic of an assumed uninterrupted transfer of the dot pattern information for a a character from the typefont buffer to the window storage.

FIG. 14 is a schematic of the output of characters p and q with different baselines in the window area.

DETAILED DESCRIPTION OF THE ILLUSTRATED EMBODIMENT

Figure 3:
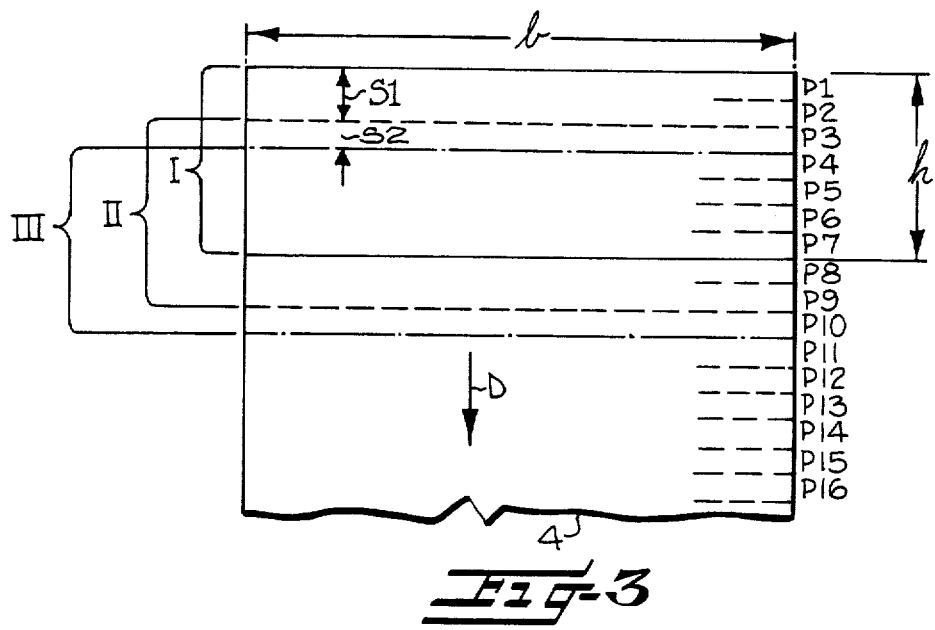
FIG. 3 is a schematic of the so-called window principle during the printing of information on the page, with the window successively assuming different positions and each window position being associated with particular page strips.

FIG. 1 is a layout plan for page to be printed which consists of text and image blocks. The page to be printed is designated as 1, the text blocks as T1, T2, T3, and T4 and the image blocks as I4 and I5. Within the text blocks, characters are arranged in lines. For this purpose, the baselines of adjacent text blocks need not be in alignment.

FIG. 2 is a schematic of the structure of a page 2 to be printed. Such a page may be printed, for example, by means of a metal paper printer. This printer is assumed to have a print head comprising, for example, 32 electrodes arranged in a column above each other. Each electrode is capable of generating a dot-shaped recording (subsequently referred to as picture element=pel) on the record carrier. The print head 3 is guided across the page in the arrow-marked direction K during a first sweep 1. Information is assumed to be recorded at particular positions within the pattern. For simplicity's sake, it is assumed that the pattern of the several positions possible on the page corresponds to a matrix of dot pattern lines arranged one below the other, wherein the individual image elements in the lines arranged below each other are aligned with each other, so that a matrix structure, consisting of dot pattern line and dot pattern columns is obtained. As the print head 3 consists of 32 print electrodes arranged above each other, 32 dot pattern lines are printed during sweep 1. The 32 electrodes of the print head are subdivided into 4 sections of 8 electrodes each. The first electrode section is assumed to be at the top of the print head, followed by the second, the third and the fourth section at the bottom. Analogously, the page is subdivided into individual strip-shaped sweep sections. Each sweep section (page strip) has 8 dot pattern lines arranged above each other. The individual page strips are designated as P1, P2, P3 ... PN, (P(n+1), P(n+2), .... During sweep 1, the first electrode section is associated with sweep section P1, the second electrode section with sweep section P2, the third electrode section with sweep section P3, and the fourth electrode section with sweep section P4. Upon completion of sweep 1, the electrode head is returned to its original position on the left in a direction opposite to that marked by arrow K, while the record carrier (the page) is advanced by 4 page strips in the direction of arrow V. During sweep 2, the print head 3 again moves across the page in the direction of arrow K, causing page strips P5, P6, P7 and P8 to be printed. Analogously, information is recorded in sweep sections P9, P10, P11, P12 and P(n+5), P(n+6), P(n+7), P(n+8), respectively, during sweeps 3 and n+8/4.

FIG. 2a is a schematic detail representation of FIG. 2 showing the dot pattern. Each page strip consists of 8 dot pattern lines arranged above each other. The dots (picture elements) of lines arranged below each other are aligned to each other, so that the previously mentioned matrix structure, consisting of lines and columns, is obtained for recording information on the page.

It is pointed out that the recording medium may not only be a page to be printed with an information pattern but also a display screen on which information is rastered or other recording media in conjunction with appropriate recording processes.

It is also pointed out that information may also be recorded in dots in a manner other than that shown in the simplified representation of FIG. 2a. Thus, it is conceivable, for example, for individual picture elements to overlap each other to obtain better character contours. In addition, the window storage principle in accordance with the invention, as will be described further on, can be used for a page structure other than that shown in FIG. 2, for which, for example, each sweep of a print head or print beam causes only one dot pattern line to be generated. In this connection, it is pointed out that the dot pattern lines may also be printed by means of cathode or laser beams, or the like, moving across a record carrier.

Figure 4:
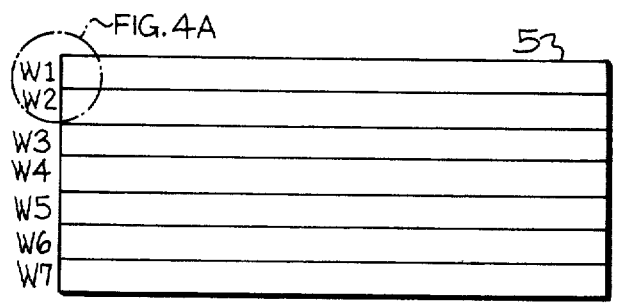
FIG. 4 is a schematic of the so-called window storage, whose bit lines are associated with dot pattern lines on the page, eight bit lines, arranged one below the other, being combined to form window storage strip.
Figure 4A:
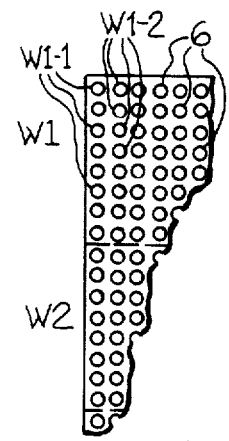
FIG. 4a is a schematic detail representation of FIG. 4 for representing a dot pattern bit-by-bit in the window storage.

In the chosen embodiment, the subdivision of the print head into sections of 8 electrodes each is based on the byte structure of the data processing system used in this case. For the printout of dot pattern information, the metal paper printer receives data from a data processing system. This data processing system comprises, in accordance with FIGS. 4 and 7, a so-called window storage or buffer (WB) 5. This window storage 5 consists of a matrix-shaped field (FIG. 4a) of storage cells 6 which are subsequently referred to as bits. The number of bits 6 in a storage line corresponds to the number of picture elements possible in a dot pattern line on the page. According to the structure of the page comprising strips that are eight picture elements high, window storage 5 has 8-bit high window storage strips W1, W2, W3 . . . W7. To suit the structure of the data processing system, eight bits arranged above each other are combined to form one byte (W1-1; W1-2) in a storage strip. This accounts for the use of the term byte structure in connection with the respective data processing system.

For simplicity's sake, window storage 5, used to edit the print data in the chosen embodiment, is assumed to comprise seven window storage strips. It will be explained subsequently what height (number of window storage strips) the window storage 5 must have to suit the height of the characters to be printed. Too large a window storage, capable of accommodating the entire dot pattern data of a page, would render the storage requirement excessive.

Therefore, the print data for a page is edited in a particular manner requiring only relatively little storage space. For this purpose, the relatively small window storage 5 is provided in which print data is edited only for a relatively small number of page strips. In other words, assuming that the page comprises 825 page strips, then it is possible, under certain conditions, to design the window storage 5 so as to have, for example, only seven storage strips. In this case, editing the print data for a page with, for example, 33 million pattern positions, requires only one window storage 5 with a total number of 0.28 million bit positions, which leads to enormous savings in storage space.

FIG. 3 is a schematic of the so-called window principle for printing information on the page. As previously mentioned, the window storage 5 has seven window storage strips W1 to W7 and a line length of as many bits as there are dots in a dot pattern line of the page. To simplify matters, it is assumed that the window storage has a height h accommodating a total number of seven page strips (e.g., P1 to P7) of the width b. Assuming furthermore that the print data in window storage 5 are edited in page storage strips W1 to W7, with which page strips P1 to P7 (window position I) are associated, then it is conceivable for the contents of the upper two window storage strips W1 and W2 to be transferred from window storage 5 to buffer 7 and for the window storage strips W1 and W2, thus becoming free, to be used for editing new print data, e.g., for page strips P8 and P9. For this purpose, however, the two window storage strips W1 and W2 would have to be associated at that time with page strips P8 and P9 (window position II).

After these page strips P8 and P9 have been edited, it is conceivable for the contents of the third window storage strip W3 to be transferred to buffer 7 and for window storage strip W3, thus becoming free, to be used to edit page strip P10. For this purpose, window storage strip W3 is associated with page strip P10.

At particular times, all the information in buffer 7 is simultaneously printed on the page. The number of edited print data always correspond to the so-called window area with the height h and the width b. For editing print data in the window area, the window storage is used in the described manner. The window area shifts on the page in the direction of arrow D from top to bottom similar to a gap h·b moving across the page from top to bottom and successively assuming different window positions I, II, and III. Thus, the print data are edited only for one window position; shifting from one window position to another is effected by buffering the contents of particular window storage strips in buffer 7 (for future printout) and by the window storage strips, thus becoming free, being made available for accommodating and editing new print data for subsequent strips on the page.

In FIG. 3, the shift from window position I to window position II is designated as S1 and from window position II to window position III as S2. In accordance with the previous embodiment, S1 corresponds to the height of two page strips, namely, P1 and P2, and S2 to the height of page strip P3.

Figure 5:
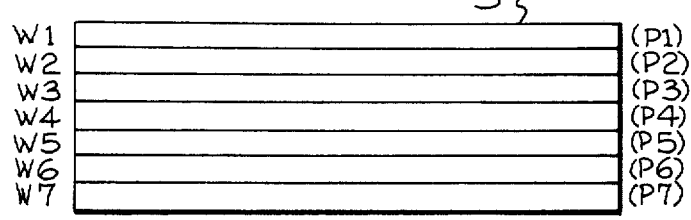
FIG. 5 is a schematic representation of the window storage with bit lines combined to form window storage strips, the window storage strips being associated with page strips of the print page.

FIG. 5 is a schematic of the window storage 5 with bit lines combined to form seven window storage strips W1 to W7. According to window position I in FIG. 3, the window storage strips W1 to W7 are associated with the page strips P1 to P7 of the print page.

Figure 6:
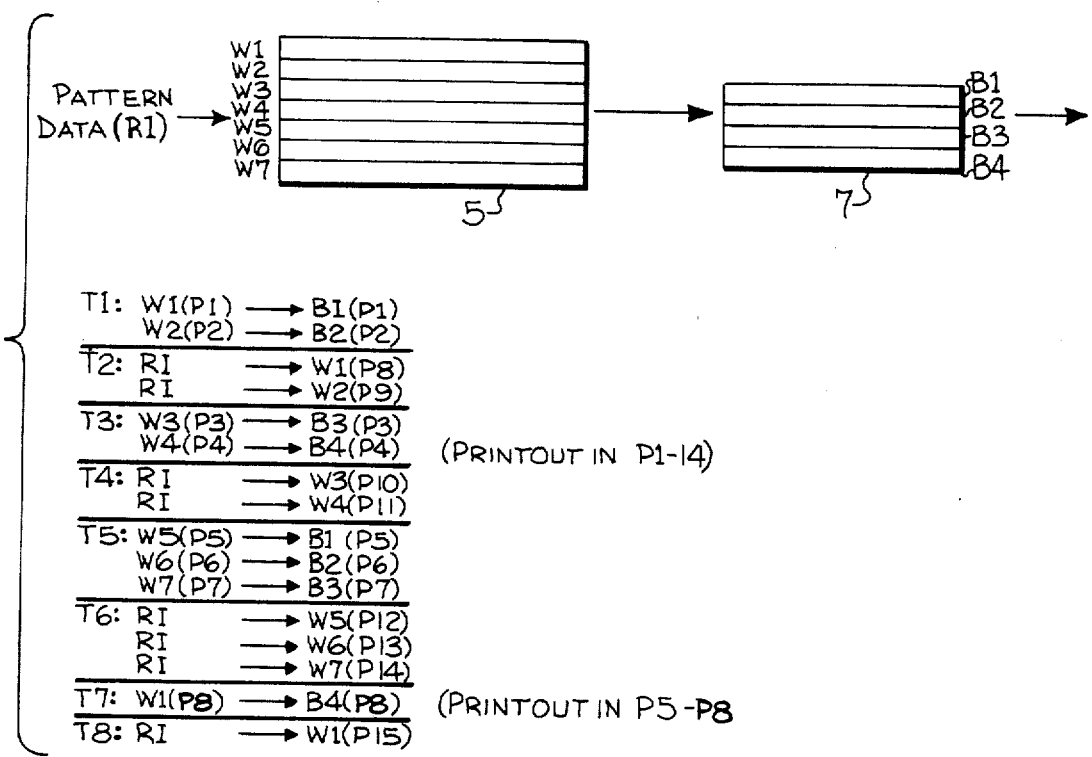
FIG. 6 is a schematic of the information flow between the window storage and a buffer as well as of the entry of information into the window storage and the output of information from the buffer.

FIG. 6 is a schematic of the information flow between window storage 5 and buffer 7 and of how information is stored in the window storage and transferred from the buffer. This figure serves to explain the shifting of the window across the page in accordance with FIG. 3.

The window storage strips, each comprising 8 bit lines arranged above each other, are designated as W1 to W7. Buffer 7 consists of four buffer strips B1 to B4. Each of these strips is designed in such a manner that it is capable of accommodating the contents of one window storage strip. After buffer 7 has been completely filled with edited print information, its contents are transferred for printout. FIG. 2 shows quite clearly that buffer 7 supplies print information for one sweep of the print head. The buffer has 32 bit lines arranged above each other corresponding to the 32 electrodes of print head 3, which are arranged above each other. One electrode for the output of the respective dot pattern information is associated with each bit line.

It is assumed that print information has been edited in window storage 5 and that page strips P1 to P7 (window position I) have been associated with window storage strips W1, W2, W3, to W7.

The steps in which printout is effected and new data are edited for the page strips following strip P7 will be described below.

During the time T1, the contents of W1 (associated with P1) are transferred to B1 (associated with P1) and the contents of W2 (associated with P2) to B2 (associated with P2). Thus, the information for P1 and P2 is buffered, and W1 and W2 are available for editing new print data for the page strips P8 and P9. During the time T2, new print data RI are transferred to W1 (now associated with P8) and W2 (now associated with P9), so that as a result, window storage 5 is again "filled".

During the time T3, the contents of W3 (associated with P3) are transferred to B3 (associated with P3) and the contents of W4 (associated with P4) to B4 (associated with P4). Subsequently, strips B1 to B4 of buffer 7 are completely "filled" with information, so that their new contents can be printed in page strips P1 to P4 in sweep 1.

(It is expressly pointed out that FIG. 3 showing the window shift has nothing to do with the printing of information in the several sweeps.)

As previously mentioned, printout takes place whenever the four buffer strips are "filled" with information and a sweep of the print head can be effected. The shifting of the window, shown in FIG. 3, is comparable to a change in association of the window storage strips and the page strips. After the contents of W3 and W4 have been transferred to buffer 7, window storage strips W3 and W4 are available for accommodating new print data RI during the time T4. For this purpose, W3 is now associated with P10 and W4 with P11. The window storage is again "filled" to capacity, and the contents of particular window storage strips can be transferred to buffer 7 which subsequently, upon completion of printout, is available for accommodating new print data for sweep 1. It is assumed that, for example, during the time T5, the contents of W5 (associated with P5) are transferred to B1 (associated with P5), the contents of W6 (associated with P6) to B2 (associated with P6), and the contents of W7 (associated with P7), to B3 (associated with P7). Subsequently, window storage strips W5, W6 and W7 are available for accommodating new print data RI during the time T6. These window storage strips are associated with the page strips P12, P13 and P14. As a result, the window storage is again completely "filled" with information. It is assumed that the contents of W1 (associated with P8) are transferred to B4 (associated with P8) during the time T7, so that buffer 7 is again "filled" with information, and page strips P5 to P8 could be printed during sweep 2. As the contents of W1 where previously transferred to buffer 7 (T2 : RI W1 (P8)) and printout was effected at T7, this window storage strip is once more available for accommodating new print data RI during the time T8, for which purpose this window storage strip W1 is associated with page strip P15, etc.

The example of the information flow between window storage 5 and buffer 7, explained in connection with FIG. 6, shows that the contents of window storage strips are transferred to the buffer in a cyclical order W1, W2, . . . W7, W1, W2 . . . W7, etc. Transfer is effected in strips, whereby several strips are transferred immediately following each other or one or several strips are transferred at time intervals not immediately following each other.

The example illustrated in FIG. 6 shows furthermore that printing is effected whenever buffer 7 is completely filled with print data for a sweep.

It is essential to know that the window principle provides for the window storage strips W1, W2 . . . W7, W1, W2 . . . W7 to be cyclically associated with the page strips P1, P2, P3 . . . Pn, P(n+1), P(n+2), P(n+3), . . . , etc. Each time the contents of one or several window storage strips have been transferred to the buffer, these strips are available for new print data for successive page strips still to be processed. This shows quite clearly how the window is "shifted" across the page in the direction of arrow D (to the several window positions).

The requirements for transferring the contents of one or several window storage strips to the buffer will be explained in greater detail elsewhere.

Figure 7:
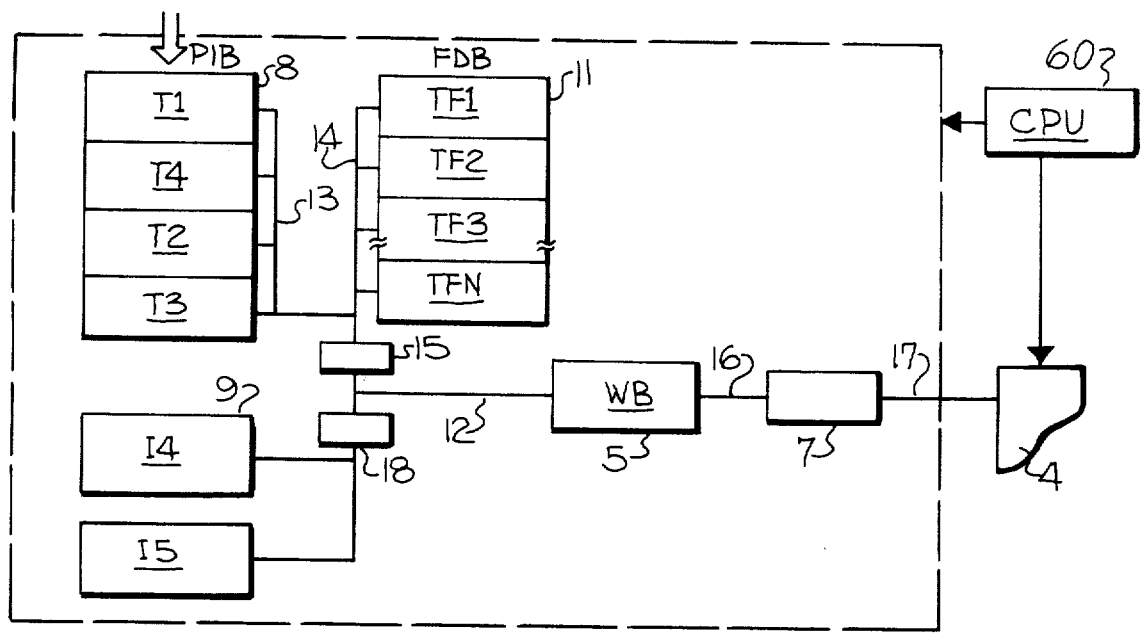
FIG. 7 is a schematic of the information flow for editing, starting with coded stored text information and image information stored in the form of (uncompressed and compressed) dot patterns, using a typefont buffer for providing dot pattern information for the several coded characters.

FIG. 7 is a schematic of the information flow for print data editing. It is assumed that there are stored coded text data and dot pattern data stored in an uncompressed or a compressed form, using a typefont buffer 11 for supplying the dot pattern information for the coded characters.

The text blocks T1, T4, T2, T3 contained in an external data stream are entered into the page input buffer (PIB) 8 of the data processing system in a random order. Each text block contains the characters in a coded form rather than in a bit dot pattern; in addition, each text block contains control information, such as the coordinate indicating the respective page position, at which the block is to be arranged, or the typefonts and type sizes to be used for the characters.

The typefont buffer 11 stores the bits representing the dot pattern of the individual characters for several typefonts. The code of each character in the text block permits accessing the bit structure of the character in the typefont buffer (FDB) 11 through lines 13 and 14. To save storage space, the characters in typefont buffer 11 are stored in a compressed form, so that before editing the print data in window storage 5, the dot pattern information for the individual characters has to be decompressed in decompressor 15. Such decompression can be effected by a suitable circuit or program, taking into account compression or decompression steps which will be explained subsequently with reference to FIG. 18. In addition to text blocks, the page input buffer 8 is capable of storing (compressed or uncompressed) image blocks bit-by-bit. Image blocks can also be stored outside the page input buffer 8 elsewhere in the data processing system. In the case of very large images (requiring an extremely large storage space because of the great number of dots contained in the patterns), these are stored in external storages. From the work storage of the data processing system the image are available only in parts. The image blocks (e.g., image block 14 designated as 9 or image block I5 designated as 10) contain, in addition to text blocks, control information, in particular coordinate data on where they are to be positioned on the page. When the text or image blocks are entered into the data processing system, the coordinates of the individual blocks also determine the layout of the page. A CPU 60 (Central Processing Unit) controls the data processing system as represented by the elements within the dash-outlined block in FIG. 7, and the data output units which print onto page 4. The individual blocks, to the extent to which they contribute to the actual window postion are accessed according to the given layout. For each text or image block, a so-called block index is generated by program. This index contains, for example, coordinate data on where the block is to be positioned on the page as well as an address pointer pointing to that part of the block which is currently essential for editing. The block index also comprises a so-called window pointer indicating whether a block and, if so, which part of it contributes to a particular window position.

Assuming that printout is based on the layout plan of FIG. 1, then it can be readily seen which text or image blocks contribute to different assumed window positions. For the first window positions, the blocks concerned are the adjacent text blocks T1 and T3, for the subsequent window positions, the text block T1, the image block I4 and the text block T2, for the window positions following these, text blocks T1, T4 and T2, whereas image block I5 contributes only to the last window positions on the page.

Assuming that text blocks T1 and T3 contribute to the first window positions. In this case, the layout plan as well as the relevant address control information determine where on the page the individual characters (of a particular typefont and size) are to be represented at a current window position.

This is made possible, for example, by associating the base of a character line with a particular dot pattern line of the page and by the widths of the characters and their spacings being known for the character sequence.

Each position of the window storage (WB) 5 can be selectively addressed. Thus, it is possible to load the characters of the individual text blocks, contributing to a window position, into the window storage 5. This means that the character is initially identified only by its code. In addition, there is information as to the position at which the character is to be entered for a particular window position. The character is represented bit-by-bit in a dot pattern. The character code in the text block permits the dot pattern representation of the respective character to be (directly or indirectly) accessed in the typefont buffer (FDB) 11 according to typefont and size. In this buffer, the individual character sets are designated as TF1, TF2, TF3, . . . TFN. It is recommendable for the bit-by-bit dot pattern representation of the individual characters to be stored in a compressed form in typefont buffer 11, so that it has to be decompressed in decompressor 15, as previously mentioned. This decompression leads to complete dot pattern information to be generated for the character and to be loaded through line 12 into the predetermined position of the window storage. Thus, the text blocks or parts thereof are transferred character-by-character to the window storage. For appropriately transferring an image block or parts thereof to the window storage, the image block is subdivided in the form of a matrix into smaller accessible units (image block fields).

If the stored image block information is compressed, each image block field has to be decompressed before being transferred to the window storage.

Figure 18:
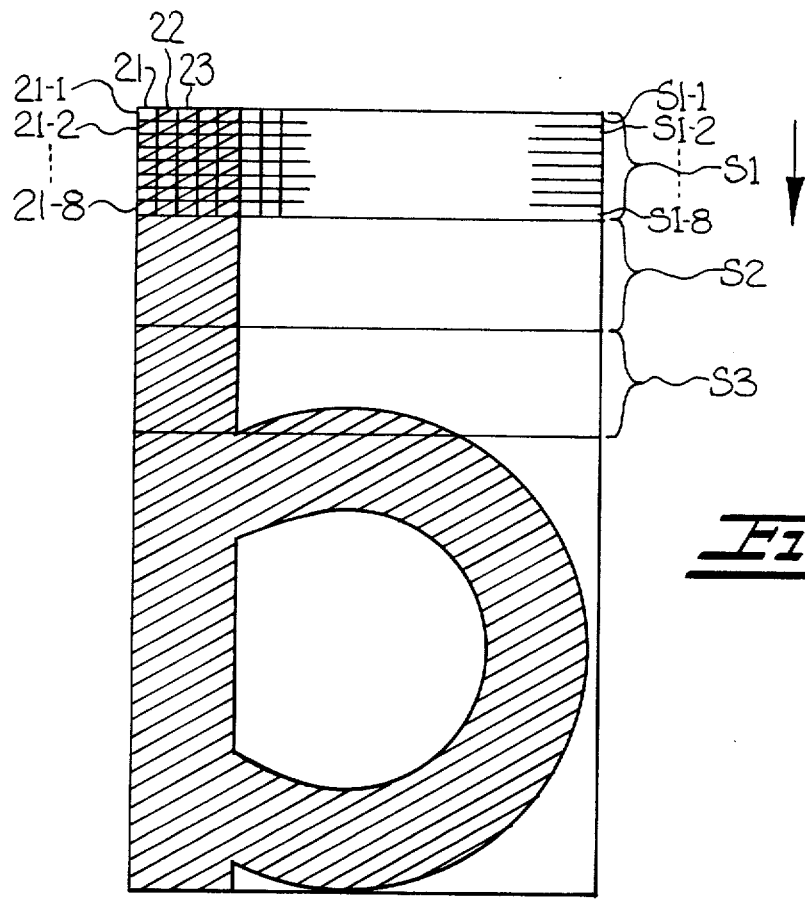
FIG. 18 is a schematic showing the compression/decompression of dot pattern character information stored in bits.

How such a compressed dot pattern representation of a character (or image block field) may be effected is shown in FIG. 18. The character is set in a tight box. This tight box is subdivided into individual strips S1, S2, S3 . . . lying above each other. Each strip consists of eight lines S1-1 to S1-8 lying above each other. In addition, the tight box is subdivided in matrix form by perpendicular lines intersecting these strip lines. Eight matrix elements (21-1 to 21-8), lying below each other in a strip (S1), are associated with eight bits of a byte (21, 22, 23).

The bytes of such a character are compressed in the direction of the arrow in the order of ascending strips. If the contents of the bits of a byte differ (e.g., binary "0" for white, binary "1" for black), the bits of this byte are not compressed. On the other hand, if the bits of a byte have the same contents (all "0" or all "1"), compression is effected by merely specifying "byte all 0" or byte all "1". For successive bytes having the same contents, the entry for the first byte is merely followed by the number of identical successive bytes. Analagously, it is possible to compress the individual image block fields of an image block.

Decompression is effected on the basis of this compression principle.

The print information is transferred through line 16 from the window storage (WB) 5 to the buffer (PB) 7 to be printed on page 4 later on through line 17.

FIG. 13 is a schematic of an assumed uninterrupted transfer of the dot pattern information for a character from the typefont buffer 11 to the window storage 5.

It is assumed that the code used for character f permits accessing its compressed dot pattern information (only the outer contours, rather than the dot pattern, of the character being shown). This compressed dot pattern information is decompressed by decompressor 15 to obtain more detailed dot pattern data.

Assuming that the character is subdivided into strips (51 to 57) (FIG. 13) and that these are suitably addressed, then it is conceivable for the dot pattern information of character f to be accessed in segments (strips). This permits fetching the pattern information for strip S1 at a time T1 and accessing the pattern information of strip S2 at another time T2, etc. If the times T1 and T2 do not immediately follow each other, the access effected during such times is subsequently referred to as "interrupted" access, as opposed to "uninterrupted" access in the case of time periods immediately following each other. For time reasons, such interrupted access is to be avoided for the window principle according to the invention. A great number of different typefonts and type sizes necessitate an enormous capacity of typefont buffer 11. Therefore, this buffer is arranged in an external data storage and its information is available only in parts from the work storage of the data processing system.

For editing the print data, it has to be taken into account that there may be frequent changes in the typefonts and type sizes.

Accessing the pattern information other than uninterruptedly would lead to disadvantages in time.

EXAMPLE

It is assumed that only half the pattern information of a character is accessed. This is followed by other steps, such as changing the typefont set in work storage. For addressing the remaining half of the character pattern information later on, it is necessary first of all to load the relevant typefont set from the external typefont buffer into the work storage of the data processing system. This time-consuming loading can be avoided by accessing the pattern information of the character at one go rather than in time periods not immediately following each other.

Loading the bit data stream into the window storage for representing the dot pattern of a character, makes it necessary for this storage to be sufficiently "high" (i.e., to have an adequate number of bit lines), so that the whole character height can be accommodated. Thus, the minimum height of the window storage is determined by the character height.

To avoid any misunderstandings, it is pointed out that the "height" of the window storage is determined in advance, say, for one page on the basis of the largest character occuring on the page.

As the text blocks supplied to the data processing system comprise, for example, information on character heights, the height of the window storage can be predetermined without any difficulties. Thus, it is easy to predetermine, for example, by program the maximum character height for a page.

There are, however, a number of reasons for which the storage may have to be made higher than is necessary for accommodating the absolute character height. One reason may be that the upper and lower ends of a character do not always terminate at a page strip boundary; other reasons will be explained in detail further on.

FIG. 8 is a schematic for transferring the dot pattern information for character f from the typefont buffer 11 to the window storage 5. In accordance with the code of character f, a particular location of the typefont buffer 11 is addressed at which the (compressed) dot pattern information for this character is stored. After the compressed dot pattern information for character f has been fetched, it is decompressed by decompressor 15 and transferred to the predetermined position in window storage 5.

As window storage 5 is selectively addressable, the dot pattern information for a character can be transferred to the window storage by address concatenation. The individual window storage strips (W1 to W7) are associated with the respective page strips. Assuming that character f (analogous to FIG. 9) is to appear in the middle of the page and its height extends from page strip P1 to page strip P7. In such a case, window storage strip W1 would be associated with page strip P1, and W2 with P2, ... W7 with P7, as shown in FIG. 9.

It is pointed out that for simplicity's sake only the transfer of a character to the window storage is shown.

FIG. 10 refers to an instance where character f according to window position II is to be printed on the page. The height of the character extends from page strip P3 to page strip P9. Assuming that window storage 5 is associated according to FIG. 11, i.e., $W1 \triangleq P1$, $W2 \triangleq P2$, $W3 \triangleq P3$, $W4 \triangleq P4$ ... $W7 \triangleq P7$ (window position I in FIG. 10), then only part 20-1 (FIG. 11) of character f 20 (FIG. 10), i.e., character f 20 (FIG. 11) with part of its descender height missing, could be loaded into the window storage.

This would be contrary to the requirement of transferring the character to the window storage at one go.

Therefore, the following procedure is adopted; According to FIG. 12, the contents of window storage strips W1 and W2, prior to loading character f into the window storage, are transferred to buffer 7 for future printout. Subsequently, these window storage strips W1 and W2 are again available for accommodating print data. For this purpose, page strip P8 is associated with window storage strip W1 and page strip P9 with window storage strip W2. The association W3=P3 to W7=P7 is retained.

As a result, window storage 5 is associated with window position II (FIG. 10) and character f can be loaded into window storage 5 at one go, so that the descender height 20-2 of character f 20 lies, figuratively speaking, above the upper part 20-1 of character f.

This example shows that for loading a character the following has to be observed:

Particular window storage strips, in which print data have been edited, are transferred to the output buffer. As a result, these storage strips become available for new print data for successive page strips of a new window position. By newly associating the window storage strips with the page strips, the whole character lying at this new window position can be transferred to the window at one go.

FIG. 14 is a schematic of the printout of characters p and q with different baseline heights. It is assumed that character p belongs to text block T1 on the left part of the page and character q to text block T3 on the right part of the page. Character p is assumed to have a baseline BL10 and character q a baseline BL30. Both baselines are assumed not to be in alignment, the baseline of character q is assumed to be higher than the baseline of character p. It is assumed further that the window is sufficiently high to accommodate one of these characters in full, depending upon the respective window position. (For simplicity's sake, characters with ascender heights will not be considered in this case.) Character q (extending from P1 to P7) is to be accommodated in full by window position I (P1 to P7) of the window storage; character p is to be accommodated by window position II (P3 to P9) of the window storage.

Figure 15A:
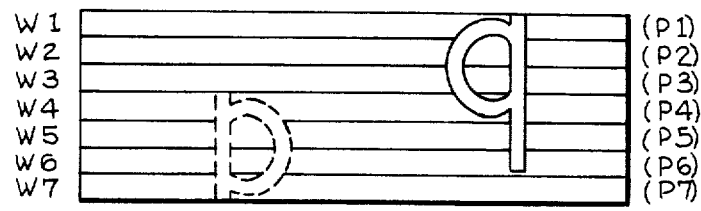
FIGS. 15a to 15c are schematics of the loading of characters p and q into the window storage and of the partial output of window storage information into the buffer.
Figure 15B:
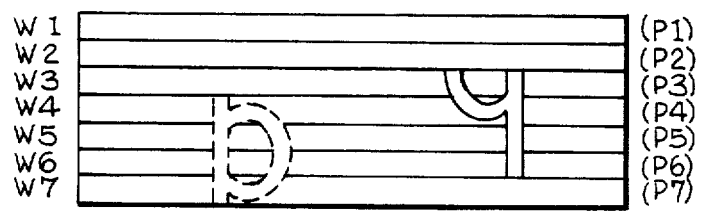
Figure 15C:
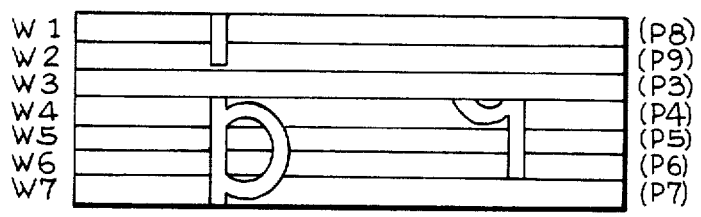

By means of FIGS. 15a, 15 b and 15c, it is shown how characters q and p are loaded into the window storage. The illustration in FIG. 15a corresponds to window position I (i.e., window storage strips W1 to W7 are associated with page strips P1 to P7). For this window position I, character q is transferred to the predetermined positions of the window storage. Transferring the whole character p to the window storage for window position I is not possible. Therefore, the upper part of character p is shown only by a broken line in FIG. 15a. After character q has been transferred to the window storage for window position I, the contents of window storage strips W1 to W2 (associated with P1 and P2) are transferred to the storage buffer for future printout (FIG. 15b). Thus, window storage strips W1 and W2 are free to accommodate new print data for the successive strips P8 and P9. As shown in FIG. 15c, these window storage strips are associated, according to window position II, with the page strips P8 and P9. At this time, it is possible to transfer character p at one go to the predetermined position in the window storage, with the height of character p extending across window storage strips W3, W4, W5, W6, W7 and W1 and W2 (which are associated with page strips P3 to P9). Subsequently, the contents of further window storage strips can be transferred to the buffer storage for printing the characters q and p.

Figure 16:
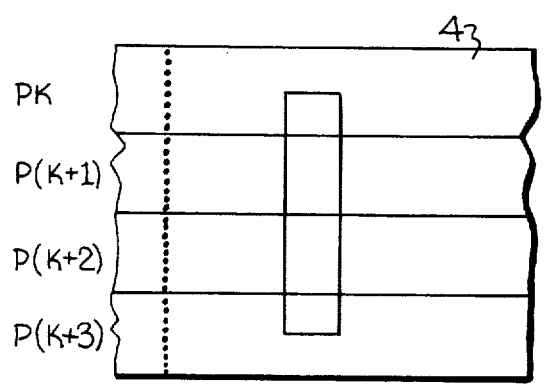
FIG. 16 is a schematic of the character I, whose upper and lower ends do not terminate at a strip boundary on the page.

FIG. 16 is a schematic of character I, whose upper and lower ends do not terminate at the strip boundary on the page. For this reason, too, the height of the window storage, instead of being based on the absolute character height, which in this case is assumed to comprise three strips lying above each other, must be determined in accordance with the number of page strips (in this case four) used in full or in part to represent information on the page (Pk, P(k+1), P(k+2), P(k+3)). The reason for this is that the window storage must be addressable in bytes. To avoid any misunderstanding, it is pointed out that it is, of course, possible to select each bit in a byte.

Figure 17:
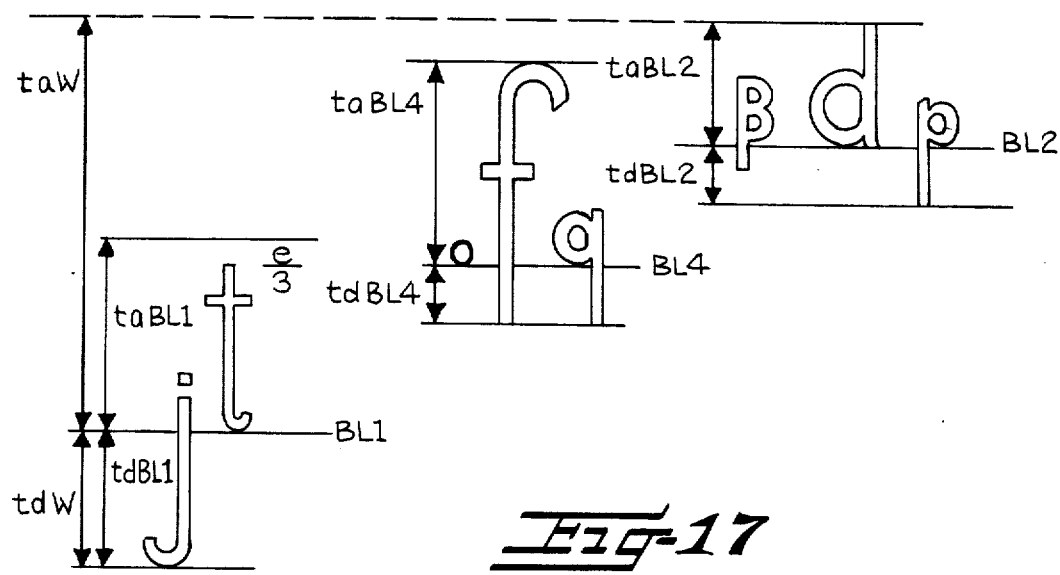
FIG. 17 is a schematic of three character groups with different baselines belonging to different text blocks.

FIG. 17 is a schematic of three character groups belonging to different text blocks and having baselines of different heights. This may be the case, for example, in a particular part of the page according to FIG. 1 where the text blocks T1, T4 and T2 adjoin each other. In addition to characters of different sizes, the individual character groups may comprise characters with exponents or indices. The individual baselines BL1, BL4, and BL2 for the character lines in blocks T1, T4 and T2 are not aligned to each other. As defined by the typography, each character has ascender, x- and descender heights. In the character group with the baseline BL1, character j has the greatest descender height which is designated as tdBL1, starting from BL1. This descender height forms the lower boundary for the character line with the baseline BL1. The upper boundary of this character line is assumed to be formed as a function of the e in the expression t(e/3) and is designated as taBL1 with respect to BL1. No other character of block T1 is assumed to reach beyond these upper and lower boundaries of the line.

This applies in analogy to the character groups with the baselines BL4 and BL2. In the character group with the baseline BL4, the character f is assumed to have the greatest descender height, thus forming the lower boundary tdBL4 with respect to BL4, whereas the upper boundary taBL4 is formed by the part of character f above BL4.

In the character group with the baseline BL2, the upper boundary taBL2 is determined by the character d and the lower boundary tdBL2 by the character p.

As previously mentioned, the window storage must have a minimum height that is sufficient to accommodate the full height of a character. However, in view of the illustration in FIG. 17, this statement must be largely modified.

The maximum height of only one character is not solely decisive for determining the window storage height. As the base for a character line (within a block) is regarded as a constant reference value, the characters of this text block include at least one character with a maximum x- and a maximum ascender height ta and another character with a maximum descender height td (the two characters being identical in only very few cases). Thus, for accommodating all characters of a text block, the window height is determined from the sum of ta plus td.

For individual characters as well as character groups with exponent (raised) or index expressions, the value of the window height should be based on the maximum upper and lower boundaries of a page line accommodating the heights of all characters or character groups referred to the baseline.

The information necessary for this purpose is contained in the data flow of the text block. For each line, the location of its baseline on the page is defined (e.g., by specifying the dot pattern line of the page). The tight box dimensions referred to the character baseline as well as information on the location of the character baseline with respect to the line base are available for each character. The maximum upper and lower boundaries of the page lines for determining the window height can be derived from these values (upon entering the text block into the data processing system).

Thus, the maximum window height is separately determined for each text block on the page. From among the window heights that may differ for the several blocks, the maximum height is selected to ensure that all character lines of the blocks are accommodated by the window storage with the maximum height.

It is obvious that the image block fields must not exceed the selected height of the window storage if they are to be processed. On the other hand (assuming that the image block field is higher than the window height determined for text processing), the height of the image block field would determine the height of the window storage.

For editing the print data, for instance, for the example shown in FIG. 17, the following approach is adopted: It is assumed that the area between the upper boundary of taBL1 and the lower boundary tdBL1 is sufficient for accommodating all character lines of the text block T1 according to their height.

This is assumed to apply in analogy to the text block T4 with its upper line boundary tBL4 and its lower line boundary tdBL4 as well as to the text block T2 with its upper line boundary taBL2 and its lower line boundary tdBL2.

The difference in height of the baselines BL1 and BL4 and BL4 and BL2 is assumed to be d1-4 and d4-2, respectively.

The window height (per page) is determined by the maximum value of the sums taBL1+tdBL1; taBL4+tdBL4; taBL2+tdBL2. In the present case, taBL1+tdBL1 determines the window height. This ensures that all characters on the page are accommodated by the window storage according to their height.

In this connection the question arises in what sequence are the text blocks T1, T4 and T2 to be accommodated by the window storage.

The basic principle used for this purpose has already been explained with respect to FIG. 14.

Based on this principle, it is merely necessary to determine by program enquiry which line in the text blocks T1, T4, T2 has the highest upper boundary; in the case of FIG. 17, this is character group "βdp" with the baseline BL2. This character group is loaded into the window storage. Subsequently, the contents of part of the window storage strips are transferred to the output buffer, so that parts of character group "ofq" with the next lower upper boundary can then be loaded into the window storage. This is again followed by the contents of part of the window storage strips being loaded into the output buffer until finally parts of the last character group j t(e/3) can be entered into the window storage.

(If the character groups illustrated in FIG. 17 belonged to only one text block instead of several text blocks, the window would have to be taW+tdW high for information supplied in the sequence j t(e/3), 0 f g, βd p.)

For the present embodiment, the description as to the sequence in which the lines of different adjacent blocks are loaded into the window storage is based on the upper boundaries of the respective lines.

This necessitates that the heights of the characters and their positions relative to the baseline are known, so that the upper boundary of a line may be deduced from these values.

In addition to the location of the baseline, each text block (in the form in which it is fed to the data processing system) may contain the height data of the characters. For determining the maximum upper and lower boundaries of the text blocks, the character with the maximum ascender and the maximum x-height and the character with the maximum descender height can be easily determined by program enquiry of the respective text block.

To eliminate this procedure of specifying the character heights in the text block supplied to the data processing system, it is possible to store the heights of the individual characters in the typefont buffer.

From a program standpoint, it would, of course, be more expensive and time-consuming for the height (sorted according to x-, ascender and descender heights) for each character of the text block to be requested from the typefont buffer and for the maximum upper and lower boundaries, necessary for determining the window height, to be derived from these values for all lines of a block.

There is, however, a very efficient approach for eliminating many of such program requests which are used to determine the maximum upper and lower boundaries of the lines of a block.

For this purpose, it is only necessary to specify in the text block supplied to the data processing system, in addition to position data for the character line base, data on maximum ascender and x-heights (all characters) and data on maximum descender heights (all characters). This permits (e.g., in the case of FIG. 17), the window height to be readily determined by establishing for the three blocks with the baselines BL1, BL4 and BL2 the maximum value of taBL1, taBL4 and taBL2 (in this case, taBL4) and the maximum value of tdBLl, tdBL4 and tdBL2 (in this case tdBL1), and the window height from the sum of taBL4+taBL1. The advantage of this is that for determining the edit sequence for the print data of the individual text blocks one only has to refer to the sequence of the character line bases of the individual blocks (rather than the upper line boundaries) in the window.

Initially, the block line with the highest baseline, i.e., BL2, is edited; this is followed by the block with the next lower baseline, i.e., BL4, and finally by the block with the baseline BL1.

The position data for the line bases are contained in the text blocks anyhow and are also included in the block indices. From a program standpoint, it is merely necessary after the window height has been determined at tabBL4+tdBL1, to inquire the position of the line bases from the block indices, in order to determine the line sequence of the different blocks for editing the data.

As mentioned, the data in a block are best sequentially supplied. In other words, the character baselines (viewed on the page) should extend from top to bottom. Deviations from this course, e.g., in the case of exponents, are acceptable but should be avoided, if possible, as they increase the window height. However, avoiding such an increase necessitates a time-consuming sorting of the characters according to their baselines.

As mentioned, the data for each block are serially supplied to the storage of the data processing system. The order in which the blocks are supplied is arbitrary. The blocks can be stored at arbitrary locations of the data processing system, ensuring by a programmable address index where the individual text or image blocks are to be accessed in storage.

As previously mentioned, the layout plan of the page (e.g., FIG. 1) for entering the individual text and image blocks is predetermined. In addition to co-ordinate data specifying the positions at which printing is to be effected, the text (and image) blocks must contain data on typefonts and type sizes to be selected, and position data for the baselines of the individual characters in the block lines. These data for editing a block are subsequently referred to as block control data.

When a text block is read into the storage of the data processing system, a suitable program prepares a so-called block index for each text (or image) block. This block index comprises, for example, the coordinate data for later on positioning the block on the page.

The relevant data are again derived from the block control data. The block index also comprises a so-called block address pointer and a so-called window storage address pointer.

The block address pointer points at a particular address of the text (or image) block, from which—if necessary through the typefont buffer—information is to be transferred to the window storage. The address of the window storage positions at which the characters are to be stored is deduced from the block control data. The characters in a character line of a block are successively transferred to the relevant parts of the window storage. The addresses are linked by the block control data. In addition, the height of the window storage is such that even the line with the greatest height is fully accommodated on the page. Thus, the characters can be transferred to the window storage at one go. It is, of course, obvious that the block address pointer must be updated for the respective control processes. The window storage address pointer indicates whether a block is contributing to a window position or not.

The dot pattern lines to be associated with each window position on the page are known. Thus, it is possible to determine by program enquiry whether a particular block is contributing to a window position or not. Depending upon the window position, absolute dot pattern lines of the page are associated with the bit lines of the window storage. By comparing the current dot pattern line on the page with the dot pattern line area of a block on the page (relevant co-ordinate values are stored in the block index), the result (in the form of a window storage address pointer) indicates whether a block is contributing to a particular window position or not.

It is obvious that the window storage address pointer must also be continuously updated.

From a program standpoint, it is not difficult to successively determine from the individual block indices at what block character line print data editing in the window storage is to begin and at what block lines it is to continue. The steps necessary for this purpose have been described in detail. Their realization by a suitable computer program is obvious to a programmer and will therefore not be described in detail. For speed or storage space reasons, it is also possible for the method according to the invention to be realized at least partly by so-called computer hardware, i.e., suitable circuits. An example of such hardware is a read-only memory for a type font buffer. Analogous to the text blocks, the image blocks contain block control data, such as coordinate data for arranging the blocks on the page, and data on the size of the individual image block fields. A block index with a block address pointer and window storage address pointer is also generated for each image block.

As the image block information is available in bits, it can be directly or indirectly (if decompression is needed) transferred to the window storage.

Although for the embodiment described, the window height is determined for a whole page, it is also conceivable for it to be determined for smaller page areas. But such an approach would be more expensive and more time-consuming from a program standpoint.

That which is claimed is:

1. Method of editing in the storage of a data processing system information which may be in the form of either characters or images to be represented in dot pattern lines on the page (or image screen) of a recording medium, wherein:
    (a) the information together with position data for arranging such information on the page is available in storage in bit notation according to the dot pattern, (b) a selectively addressable storage—subsequently referred to as window storage (5)—which is smaller than would be necessary for representing an entire page bit-by-bit, is provided for editing part of the information of the page comprising n dot pattern lines, (c) a buffer storage (7) is provided for accommodating the contents of the window storage of k bit lines (k < n) which are to be recorded on the page later, (d) the bit lines of the window storage (5) are cyclically associated with successive dot pattern lines (P1, P2, P3) of the page, (e) the contents of the bit lines of the window storage (5), that have been edited for recording, are successively transferred line-by-line to the buffer storage (7), (f) after the contents of one or several bit lines of the window storage (5) have been transferred to the buffer storage (7), the bit lines of the window storage (5) thus becoming free are available for accommodating information to be newly edited for subsequent dot pattern lines (Pn+1, Pn+2 ...) on the page, (g) compared to the number of its bit lines, the window storage (5) has a mininum height which permits accommodating an image block field of an image subdivided into fields in the form of a matrix and treated as an image block, as well as an assumed character having predetermined upper and lower boundaries to accommodate maximum ascender, x- and descender heights in a reference area of full page width, and (h) the bit information of a block field in storage is accessed in continuous periods, and that this bit information is transferred in continuous periods to the part of the window storage (5) designated by the position data.

2. Method according to claim 1, wherein for a byte-oriented storage (1 byte = q bits) the print data are transferred byte-by-byte and q-bit-parallel.

3. Method according to claim 1, wherein the height of the window storage (5) is determined for each page.

4. Method according to claim 1, wherein its use is for laser printers.

5. Method according to claim 1 for use in a metal paper printer with a k-electrode print head, wherein each electrode generates one dot pattern line.

6. Method according to claim 1, wherein a page layout with adjacent blocks, the lines of information of all blocks are transferred, wherein the order of their transfer is by either the upper boundaries or the baselines on the page, (from top to bottom) to the window storage (5).

7. Method according to claim 6, wherein adjacent blocks of aligned lines are transferred in a random order to the window storage (5).

8. Method according to claim 6, wherein for a page layout with adjacent blocks with non-aligned lines, initially the line of the block having its upper boundary on the page above that of the lines of other blocks is transferred to the window storage (5), and subsequently the contents of the bit lines of the window storage (5), which are between the upper boundary of the line of the block just transferred to the window storage (5) and the upper boundary next to it of the line of one of the other blocks, are transferred to the buffer storage (7) to be recorded later, or in the alternative, initially the line of the block having its baseline on the page above that of the lines of other blocks, is transferred to the window storage (5), and that the contents of the bit lines of the window storage (5), which are necessary for subsequently accommodating that block line having its baseline closest to the baseline of the block just transferred to the window storage (5), are then transferred to the buffer storage (7).

9. Method according to claim 8, wherein the height of the window storage for non-aligned upper boundaries of block field lines of adjacent blocks, provided it excees a maximum predetermined block field height, is a function of the maximum value of the partial sums which are obtained by adding the maximum distance of the upper boundary of a line within a block from the line base and the maximum distance of the lower boundary of a line of that block from the line base, and that the individual lines of the several adjacent blocks are loaded in the order of their upper boundaries on the page to the window storage (5).

10. Method according to claim 8, wherein the height of the window storage with non-aligned baselines of the lines of adjacent blocks, provided it exceeds a maximum predetermined block field height, is derived from the sum of two values, whereby the first value is the maximum distance of the upper boundary of an arbitrary line of all blocks from the line base and the second value is the maximum distance of the lower boundary of an arbitrary line of all blocks from the line base, and that the individual block lines are loaded in the order of their baselines on the page to the window storage (5).

11. Method according to any one of the claims 1 to 10, wherein the information for a page layout comprising blocks is supplied in blocks to the data processing system, that the blocks, in addition to the coded characters, comprise data for later positioning of the block and the characters on the page, information on the character type and size, as well as control information for determining the window height, that the pattern information for a character defined by its code can be fetched from a typefont buffer (11), and that the blocks contain dot pattern information.

12. Method of editing in the storage of a data processing system information to be represented in dot pattern lines on an image wherein:

(a) said information together with position data for arranging such information in said image is available in storage in bit notation according to the dot pattern, (b) a selectively addressable window storage is provided for editing part of said information of said image comprising n dot pattern lines, (c) buffer storage is provided for accommodating contents of said window storage of k bit lines (k < n) to be imaged, (d) said bit lines of said window storage are cyclically associated with successive dot pattern lines of said image, (e) contents of the bit lines of said window storage, that have been edited for recording, are successively transferred line-by-line to said buffer storage, and (f) after the contents of one or several bit lines of said window storage have been transferred to the buffer storage, bit lines of the window storage thus becoming free are available for accommodating information to be newly edited for subsequent dot pattern lines in the image.

* * * * *

UNITED STATES PATENT AND TRADEMARK OFFICE
CERTIFICATE OF CORRECTION

PATENT NO. : 4,581,710

DATED : April 8, 1986

INVENTOR(S) : Helmut Hasselmeier, Aidlingen, Fed. Rep. of Germany

It is certified that error appears in the above-identified patent and that said Letters Patent is hereby corrected as shown below:

Claim 1, Column 16, line 66, "ayailable" should be -- available --

Signed and Sealed this

Twenty-second Day of July 1986

[SEAL]

Attest:

DONALD J. QUIGG

Attesting Officer

Commissioner of Patents and Trademarks